United States Patent [19]
Buckingham

[11] Patent Number: 5,158,592
[45] Date of Patent: Oct. 27, 1992

[54] UNIVERSAL GLASS SHEET MOLD SUPPORT ASSEMBLY

[76] Inventor: James W. Buckingham, 3381 Alexander Rd., Pemberville, Ohio 43450

[21] Appl. No.: 641,493

[22] Filed: Jan. 15, 1991

[51] Int. Cl.5 ............................................ C03B 23/023
[52] U.S. Cl. ........................................ 65/272; 65/289
[58] Field of Search ................. 65/286, 287, 289, 290, 65/272, 273, 171-173

[56] References Cited

U.S. PATENT DOCUMENTS

| 4,290,796 | 9/1981 | Reese et al. | 65/287 |
| 4,606,749 | 8/1986 | Nushi et al. | 65/273 X |
| 4,711,654 | 12/1987 | Iida | 65/172 |
| 4,737,182 | 4/1988 | Fecik et al. | 65/106 |
| 4,756,735 | 7/1988 | Cathers | 65/290 X |
| 4,778,507 | 10/1988 | Aruga et al. | 65/289 X |

Primary Examiner—Robert L. Lindsay

[57] ABSTRACT

A universal glass sheet mold support assembly (10) is disclosed as including a mold support frame (18) mountable in the bending section (14) of a glass sheet heating furnace (12). The mold support frame (18) includes a first registration member (22) that defines in part a standardized registration system. An intermediate frame (26) having a shaping mold (16) mounted thereon forms a replaceable unit. The intermediate frame (26) includes a second registration member (28) that completes the definition of the standardized registration system. The standardized registration system and a quick disconnect linkage assembly (40) mount a variety of shaping molds (16) on the single mold support frame (18).

9 Claims, 2 Drawing Sheets

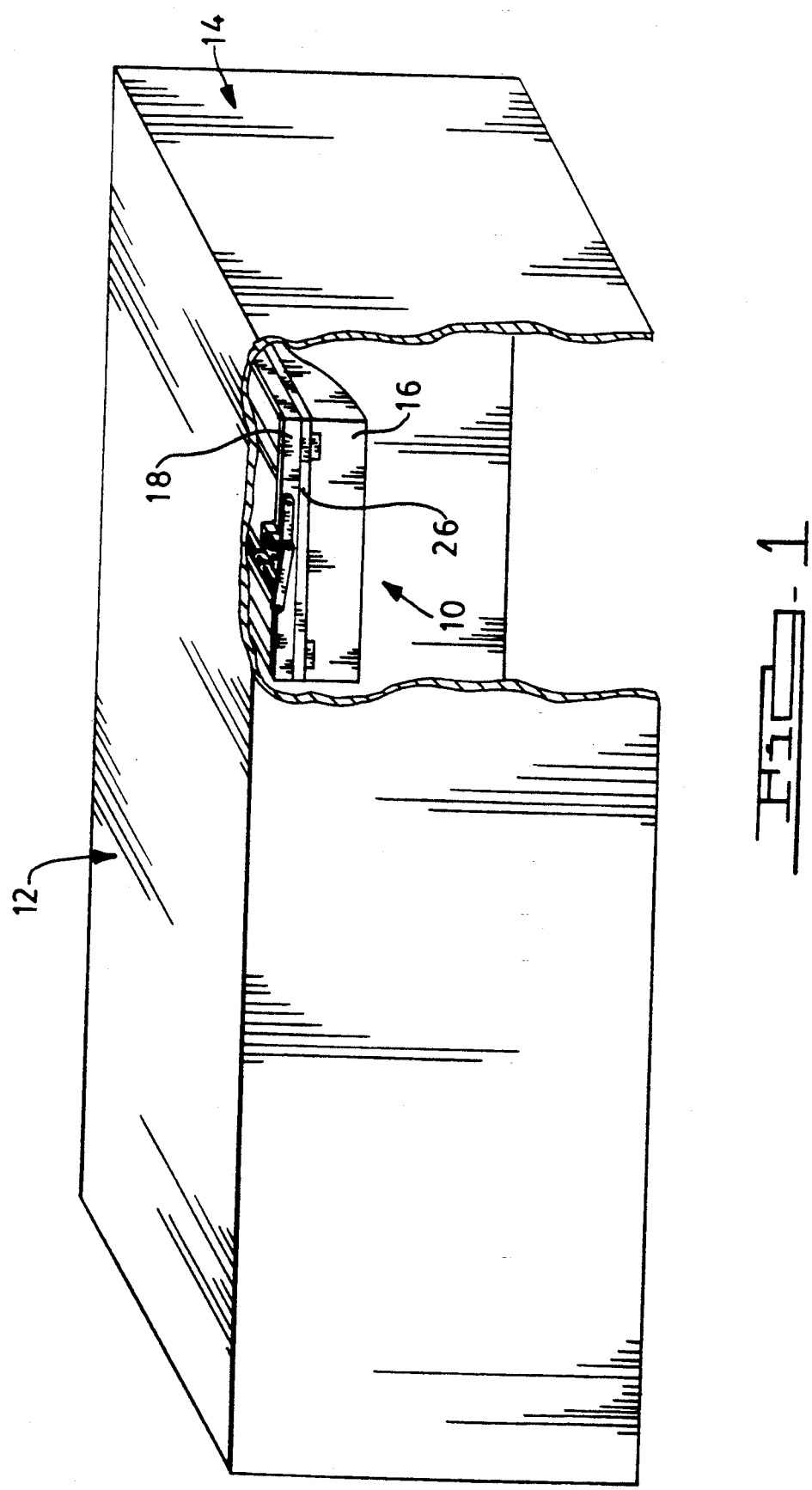

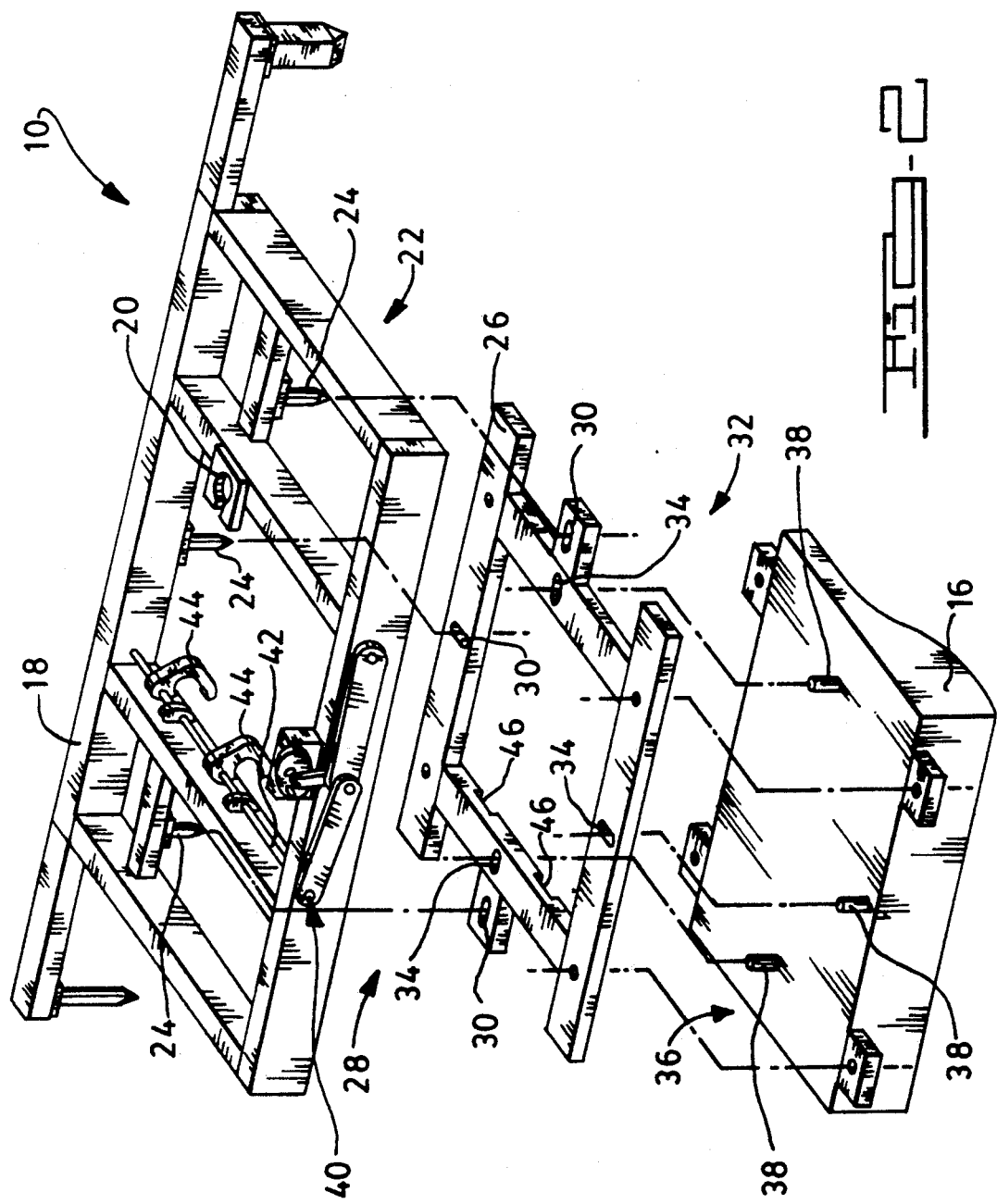

UNIVERSAL GLASS SHEET MOLD SUPPORT ASSEMBLY

TECHNICAL FIELD

This invention relates to a universal glass sheet mold support assembly, and more particularly, to a shaping mold support assembly that interchangeably mounts many different shaping molds.

BACKGROUND ART

In a conventional glass sheet heating furnace having a bending section, a glass sheet shaping mold is mounted to a large mold support frame specifically designed for that mold. This combination of shaping mold and support frame forms a mold assembly. This assembly is generally universally mountable in the bending section. Each time a shaping mold or tool is changed, the support frame is disconnected from the bending section and the assembly is removed therefrom. Then, another mold mounted to another support frame is mounted in the bending section.

This conventional shaping mold mounting arrangement is expensive because it requires a large mold support frame for each shaping mold. Also, this assembly takes a large number of shifts to change the shaping mold because of, the awkwardness of handling the large support frame with shaping mold and, the cool down and heat up times of the support frame and shaping mold.

SUMMARY OF THE INVENTION

An object of the present invention is to provide a universal glass sheet mold support assembly that reduces the time it takes to change a glass sheet shaping mold.

A further object of the invention is to provide a universal glass sheet mold support assembly that reduces tooling costs and provides an interchangeable mounting for mounting many different glass sheet shaping molds on a standardized support frame.

In carrying out the above objects and other objects of the invention, the universal glass sheet mold support assembly is used to mount a glass sheet shaping mold in a glass sheet heating furnace having a bending section. The assembly comprises a mold support frame mountable by conventional mounting means in the bending section of a furnace.

The mold support frame includes a first registration member defining in part a standardized registration system. The assembly also comprises an intermediate frame that mounts the shaping mold to the mold support frame. The intermediate frame includes a second registration member that completes the definition of the standardized registration system and cooperably registers with the first registration member. Thereby, the first and second registration members accurately and interchangeably mount together the intermediate frame and mold support frame.

The intermediate frame also includes a mounting member for mounting the shaping mold to the intermediate frame. Through the use of the intermediate frame with the standardized registration system, the assembly provides a standardized system for easily and quickly mounting a wide variety of shaping molds onto a single mold support frame in the bending section of the furnace.

In the preferred embodiment of the invention, the first registration member includes a plurality of alignment pins and the intermediate frame includes a corresponding plurality of alignment slots for receiving the alignment pins to provide accurate alignment of the mold support and intermediate frames so that an aligned connection can be made in a heated or cool condition of one or both parts. In a similar fashion, the shaping mold includes a plurality of positioning pins and the intermediate frame includes a corresponding plurality of positioning slots for receiving the positioning pins to provide proper positioning of the shaping mold on the intermediate frame. The mold support frame further includes a quick connect/disconnect linkage assembly for quickly engaging and disengaging the intermediate frame therefrom.

Preferably, the mold support frame and intermediate frame is of stainless steel tubular construction. Alternatively, the intermediate frame is a steel casting.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective schematic view of a glass sheet heating furnace including a bending section illustrated as having a universal glass sheet mold support assembly constructed in accordance with the present invention; and FIG. 2 is a perspective assembly view of the universal glass sheet mold support assembly illustrating its construction.

BEST MODE FOR CARRYING OUT THE INVENTION

Referring to Figure of the drawings, a universal glass sheet mold support assembly constructed in accordance with the present invention is generally indicated by reference numeral 10 and is used in connection with a glass sheet heating furnace 12 having a bending section 14 for allowing different glass sheet shaping molds 16 to be interchangeably mounted in the furnace. As is hereinafter more fully described, the universal glass sheet mold support assembly 10 reduces the down time associated with glass sheet shaping tool changes and the expense of requiring a separate mold support for each glass sheet shaping tool.

As shown in FIGS. 1 and 2 of the drawings, the universal glass sheet mold support assembly 10 includes a mold support frame 18 mounted in the bending section 14 of furnace 12. A conventional packman connection 20 mounts the mold support frame 18 in the bending section 14 where the mold support frame will stay unless a change is necessitated for general maintenance etc. As illustrated in FIG. 2, the mold support frame 18 includes a first registration member 22 including a plurality of alignment pins 24 defining in part a standardized registration system.

With further reference to FIG. 2, assembly 10 includes an intermediate frame 26 mounting the shaping mold 16 to the mold support frame 18. The intermediate frame 26 includes a second registration member 28 including a plurality of alignment slots 30 corresponding to the alignment pins 24 for receiving the alignment pins to provide alignment of the mold support and intermediate frames 18, 26. The intermediate frame 26 stays with the mold 16 as a unit as a mold change is effected on the mold support frame 18. The positioning of the pins 24 and slots 30 establish the standardized registration system that allows for interchangeability of intermediate frame 26 and mold 16 units and also accurately aligns the intermediate frame 26 with respect to support 18 regardless of temperature differences between the two parts.

The intermediate frame 26 includes a first mounting member 32 including a plurality of positioning slots 34 and the shaping mold 16 includes a second mounting member 36 including a plurality of positioning pins 38 corresponding to the plurality of positioning slots for mounting the shaping mold to the intermediate frame. Preferably, the positioning pins 38 are bolts and each shaping mold 16 is bolted to an intermediate frame 26 whereby changing of the shaping mold is accomplished through quickly disconnecting and connecting the standardized registration system of the mold support frame 18 and intermediate frame 24.

With continued reference to FIG. 2, the mold support frame 18 includes a quick disconnect linkage assembly 40 for quickly engaging and disengaging the intermediate frame 26 from the mold support frame. The linkage assembly 32 includes a crank 42 and crank actuated hooks 44. Preferably, the intermediate frame 26 includes hook receptacles 46 for engaging hooks 44. Thereby, the intermediate frame 24 and shaping mold 16 are quickly connected and disconnected from mold support frame 18 by actuating partial rotation of crank 42 to engage or disengage hooks 44 with receptacles 46 as the case may be.

In the preferred embodiment of the invention, the mold support frame 18 is of stainless steel tubular construction which provides a generally inexpensive structure having the requisite heat resistance and shape maintaining capabilities associated with glass sheet shaping tooling. Herein, the intermediate frame 26 is also of stainless steel tubular construction, or alternatively, a steel casting.

While the best mode for carrying out the invention has been described in detail, those familiar with the art to which this invention relates will recognize various alternative designs and embodiments for practicing the invention as defined by the following claims.

What is claimed is:

1. A universal glass sheet mold support assembly for mounting a glass sheet shaping mold in a glass sheet heating furnace having a bending section, the assembly comprising:

a mold support frame mountable in the bending section of the furnace; said mold support frame including a first registration member, defining in part a standardized registration system, and a quick disconnect linkage assembly for quickly engaging and disengaging an intermediate frame therefrom; and an intermediate frame mounting the shaping mold to said mold support frame; said intermediate frame including a second registration member completing the definition of the standardized registration system for cooperable registration with said first registration member; said second registration member accurately aligning said intermediate frame to said mold support frame regardless of temperature differences therebetween; said intermediate frame also including a mounting member for mounting the shaping mold to said intermediate frame whereby to provide a standardized system for easily mounting a wide variety of shaping molds in the bending section of a furnace.

2. An assembly as in claim 1 wherein said first registration member includes a plurality of alignment pins and said intermediate frame includes a corresponding plurality of alignment slots for receiving said alignment pins to provide alignment of said mold support and intermediate frames.

3. An assembly as in claim 2 wherein said shaping mold includes a plurality of positioning pins and said intermediate frame includes a corresponding plurality of positioning slots for receiving said positioning pins to provide proper positioning of said shaping mold on said intermediate frame.

4. A universal glass sheet mold support assembly for mounting a glass sheet shaping mold in a glass sheet heating furnace having a bending section, the assembly comprising:

a mold support frame mountable in the bending section of the furnace; said mold support frame including a first registration member including plurality of pins defining in part a standardized registration system; said mold support frame also including a crank and hooks defining in part a quick connect linkage assembly; and an intermediate frame mounting the shaping mold to said mold support frame; said intermediate frame including a second registration member including a plurality of slots generally corresponding to said plurality o pins for engagement thereof and completing the definition of the standardized registration system; said first and second registration members accurately aligning said intermediate frame and said mold support frame regardless of temperature differences therebetween; said intermediate frame also including a mounting member for mounting the shaping mold to said intermediate frame; said intermediate frame including hook receptacles completing the definition of said quick connect linkage assembly whereby to provide a standardize system for easily mounting a wide variety of shaping molds via said standardized registration members in the bending section of a furnace.

5. An assembly as in claim 1 wherein said linkage assembly includes a crank and hooks mounted on said crank.

6. An assembly as in claim 5 wherein said intermediate frame includes hook receptacles for receiving said hooks to mount said intermediate frame on said support frame.

7. An assembly as in claim 1 wherein said mold support frame is of stainless steel tubular construction.

8. An assembly as in claim 1 wherein said intermediate frame is of stainless steel tubular construction.

9. An assembly as in claim 1 wherein said intermediate frame is steel casting.

* * * * *

UNITED STATES PATENT AND TRADEMARK OFFICE
CERTIFICATE OF CORRECTION

PATENT NO. : 5,158,592

DATED : October 27, 1992

INVENTOR(S) : JAMES W. BUCKINGHAM

It is certified that error appears in the above-identified patent and that said Letters Patent is hereby corrected as shown below:

Claim 4, column 4, line 36, after "plurality" delete "o" and substitute therefor -- of --.

Claim 4, column 4, line 47, delete "standardize" and substitute therefor -- standardized --.

Signed and Sealed this

Second Day of November, 1993

Attest:

BRUCE LEHMAN

Attesting Officer     Commissioner of Patents and Trademarks